(12) United States Patent
Punaganti Venkata et al.

(10) Patent No.: US 7,957,723 B2
(45) Date of Patent: Jun. 7, 2011

(54) SHARING INFORMATION FEED DATA

(75) Inventors: Murali Krishna Punaganti Venkata, Vantaa (FI); Sameh Galal, Cairo (EG); Chand Kumar Malu, Vantaa (FI)

(73) Assignee: Nokia Corporation, Espoo (FI)

( * ) Notice: Subject to any disclaimer, the term of this patent is extended or adjusted under 35 U.S.C. 154(b) by 116 days.

(21) Appl. No.: 10/957,419

(22) Filed: Oct. 1, 2004

(65) Prior Publication Data

US 2006/0073812 A1    Apr. 6, 2006

(51) Int. Cl.
*H04L 12/58* (2006.01)
(52) U.S. Cl. ............... 455/412.1; 455/412.2; 455/426.1; 709/204
(58) Field of Classification Search ............... 455/412.1, 455/457, 414.1, 412.2, 414.2, 3.05, 3.01, 455/426, 412; 709/206, 217, 204
See application file for complete search history.

(56) References Cited

U.S. PATENT DOCUMENTS

| | | | | |
|---|---|---|---|---|
| 4,922,518 | A | * | 5/1990 | Gordon et al. ............... 340/7.28 |
| 5,954,793 | A | * | 9/1999 | Stutman et al. ............... 709/204 |
| 6,327,610 | B2 | | 12/2001 | Uchida et al. |
| 6,421,707 | B1 | | 7/2002 | Miller et al. |
| 6,941,510 | B1 | | 9/2005 | Ozzie et al. |
| 2002/0006793 | A1 | * | 1/2002 | Kun-Szabo et al. ........... 455/426 |
| 2002/0107002 | A1 | * | 8/2002 | Duncan et al. ................ 455/412 |
| 2002/0143819 | A1 | * | 10/2002 | Han et al. ....................... 707/513 |
| 2004/0015562 | A1 | * | 1/2004 | Harper et al. .................. 709/217 |
| 2004/0224693 | A1 | * | 11/2004 | O'Neil et al. .................. 455/445 |
| 2006/0089160 | A1 | * | 4/2006 | Othmer ........................... 455/457 |

FOREIGN PATENT DOCUMENTS

EP     0905943 A2     3/1999

OTHER PUBLICATIONS

U.S. Appl. No. 10/884,793, filed Jul. 1, 2004, Punaganti Venkata.
U.S. Appl. No. 10/388,190, filed Mar. 13, 2003, Lonnfors et al.
U.S. Appl. No. 10/394,591, filed Mar. 21, 2003, Immonen.
U.S. Appl. No. 10/921,072, filed Aug. 18, 2004, Punaganti Venkata et al.

* cited by examiner

*Primary Examiner* — Charles Shedrick
(74) *Attorney, Agent, or Firm* — Ditthavong Mori & Steiner, P.C.

(57) ABSTRACT

Sharing information feed data via a network involves forming a token describing the information feed data. The token is received at a first data processing arrangement via the network. The token is processed at the first data processing arrangement to determine the information feed data. Access to the information feed data is provided at the first data processing arrangement based on processing of the token.

35 Claims, 7 Drawing Sheets

SHARING INFORMATION FEED DATA

FIELD OF THE INVENTION

This invention relates in general to communications devices, and more particularly to communications devices configured for receiving information feeds via a network.

BACKGROUND OF THE INVENTION

Mobile communications devices such as cell phones are gaining wider acceptance due to the capabilities being added to such devices. Some mobile communications devices provide access to all manner of digital communications over wireless data links. These devices may include data processing capabilities for creating, modifying, processing, and viewing various types of data.

One type of data processing that has become increasingly popular is information feeds. Information feeds can be generally described as technologies for providing regularly updated data items of interest (e.g., news) to an electronic device. Technologies such as Resource Description File Site Summary (RSS) (also referred to as Really Simple Syndication) and Atom allow users to subscribe to information feeds available over the Internet. Once subscribed, the user can see a collection of data items available on the particular feed. The data items typically include a title and a short description. The data items may also provide links to a World Wide Web page or other resource that the user may access for more detailed information about the subject of the data item.

In one example of an information feed, a Web browser can incorporate a plug-in component to discover and process RSS feeds. The user may choose RSS feeds by typing in a URL, selecting a hyperlink in a Web page, or by using a search mechanism. After a feed is selected, the user will be presented with a collection (e.g., a list) of items currently contained in the feed. The data items contain a title and a (typically) short description, such as a headline and summary paragraph of a news article. The user may select one of the data items to have the browser directed to a Web page that provides the full story described by the RSS feed item. As time goes on, the list of RSS data items will be automatically updated.

Technologies such as RSS information feeds are ideal for portable communications device. Portable devices can be carried with the user at all time, therefore the continuously updated information feeds can be the fastest way to disseminate news and other time critical data to users of such devices. Also, the fact that the feeds contain condensed data allows users to perceive and filter information without consuming a great deal of bandwidth or user interface real estate, both of which are at a premium in mobile devices.

Current implementations of information feeds were not specifically designed for mobile devices. The majority of devices that access information feed access are the same general-purpose computers used to access the Web and other Internet services. Therefore, improvements in the managing information feeds may be desirable in order to increase the utility of information feeds on mobile electronic devices.

SUMMARY OF THE INVENTION

The present disclosure relates to a system, apparatus and method for sharing information feed data. In one embodiment, a method involves forming a token describing the information feed data. The token is received at a first data processing arrangement via the network. The token is processed at the first data processing arrangement to determine the information feed data. Access to the information feed data is provided at the first data processing arrangement based on processing of the token.

In a more particular embodiment, the method also involves prompting a user of the first data processing arrangement to confirm acceptance of the token before processing the token. The method may also involve, before receiving the token at the first data processing arrangement selecting one or more information feeds at a second data processing device and forming the token at the second data processing device based on the selection.

In one configuration, processing the token at the first data processing arrangement involves determining a reference to one or more information feeds from the token. The second data processing arrangement may be a peer of the first data processing arrangement, and the first and/or second data processing arrangements may include mobile terminals.

In other configurations, the information feed may include an RSS feed. The token may include a structured data file, such as an Outline Processor Markup Language (OPML) file. The information feed data may include a reference to one or more information feeds. More particularly, the reference to one or more information feeds may be arranged as a hierarchical collection. In another arrangement the information feed data may include a data item of an information feed. In still another configuration of the method, receiving the token at a first data processing arrangement may involve transferring data using at least one of e-mail, Bluetooth, infrared, short message service (SMS) and multimedia sessions.

In another embodiment of the present invention, a processor-readable medium includes a program storage device configured with instructions for causing a processor of a data processing arrangement capable of being coupled to a network to perform a number of operations. Those operations include receiving a token describing information feed data via the network; processing the token to determine the information feed data; and providing access to the information feed data via a user interface (UI) of the data processing arrangement based on processing of the token.

In a more particular embodiment, the operations further include prompting a user via the UI of the data processing arrangement to confirm acceptance of the token before processing the token. In other configurations, the information feed data includes a reference to one or more information feeds. The token may include a structured data file such as an Outline Processor Markup Language (OPML) file.

In another embodiment of the present invention, a processor-readable medium includes a program storage device configured with instructions for causing a processor of a data processing arrangement capable of being coupled to a network to perform a number of operations. Those operations include: providing user selection of one or more information feeds accessible via the data processing arrangement; forming a token describing data accessible by the one or more information feeds the token usable by a network entity for accessing the data feeds; and sending the token via the network.

In a more particular embodiment, the operations further include prompting the user to determine a data transfer mechanism used for sending the token. The data transfer mechanism may utilizes at least one of e-mail, Bluetooth, infrared, short message service (SMS) and multimedia sessions. In another configuration, forming the token describing data accessible by the one or more information feeds may involve including a reference to one or more information feeds in the token.

In another embodiment of the present invention, an apparatus includes a network interface configured to exchange data via a network, a user interface, and a processor coupled to the network interface and the user interface. The apparatus includes a data storage arrangement having an information feed reader and an information feed data exchange module. The information feed reader has instructions that cause the processor to access information feeds via the network interface and present information feeds to a user via the user interface. The information feed data exchange module has instructions that cause the processor to: receive, via the network interface, a token describing information feed data; process the token to determine the information feed data; and provide access to the information feed data via the information feed reader based on processing of the token.

In another embodiment of the present invention, an apparatus includes a network interface configured to exchange data via a network, a user interface, and a processor coupled to the network interface and the user interface. The apparatus includes a data storage arrangement having an information feed reader and an information feed data exchange module. The information feed reader has instructions that cause the processor to access information feeds via the network interface and present information feeds to a user via the user interface. The information feed data exchange module having instructions that cause the processor to determine user selection of one or more information feeds accessible via the information feed reader; form a token describing data accessible by the one or more information feeds, the token usable by a network entity for accessing the data feeds; and send the token via the network interface.

In another embodiment of the present invention, a system includes means for providing user selection of one or more information feeds accessible via a first data processing arrangement; means for forming a token describing data accessible by the one or more information feeds; means for communicating the token to a second data processing arrangement; means for processing the token to determine the information feed data; and means for providing access to the information feed data at the second data processing arrangement based on processing of the token.

The above summary of the present invention is not intended to describe each illustrated embodiment or implementation of the present invention. This is the purpose of the figures and the associated discussion that follows.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present disclosure is directed to mechanisms for managing information feeds on mobile devices and other computing apparatuses. The devices may be arranged to allow selecting information feed data to share with a destination user. The information feed data is communicated to a computing device of the destination user. This communication may include sending a reference to one or more data feeds, and/or sending part or all of the data contained in a feed. The destination user may receive this communication asynchronously via an active connection or in conjunction with a particular event, such as initiating a data transfer via the network. The destination device is arranged to process the data and automatically provide access to the information feed data received. Providing access may involve allowing the user to view and store the data and/or connect to the device to the source of the information feed.

The concepts described herein in relation to sharing information feed data are applicable to any type of communication systems, devices, and networks. In order to facilitate an understanding of the invention, the present invention may be described in the context of mobile devices in a wireless networking environment. It will be appreciated, however, that the invention may be applicable in any system or application where sending data feeds to data processing devices is desired.

Figure 1:
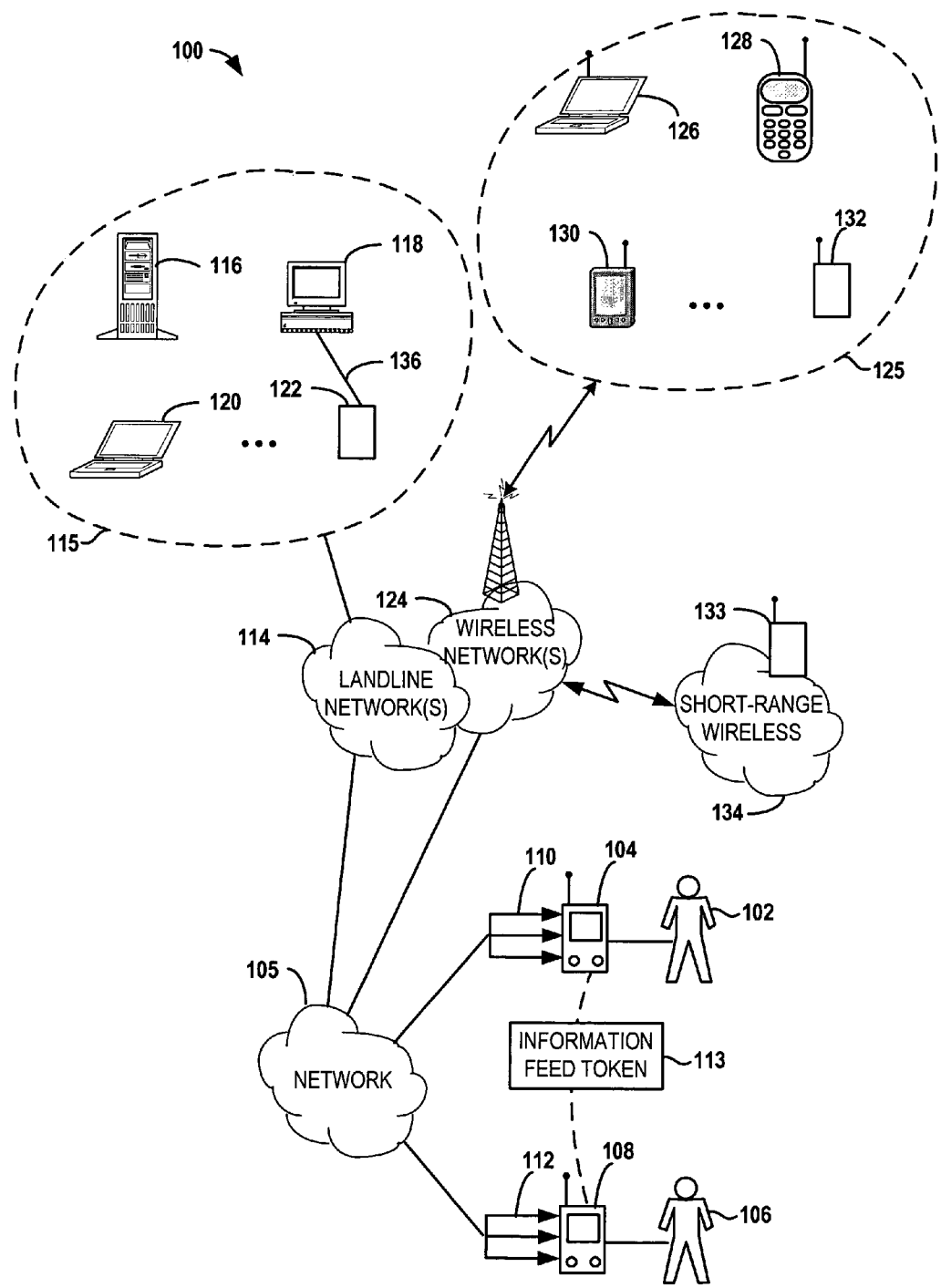
FIG. 1 illustrates an information feeder framework according to embodiments of the present invention.

It will be appreciated that many network services exist that can be used to provide information feeds to computing devices. FIG. 1, which shows an example environment 100 in which information feeds may be implemented according to embodiments of the present invention. In FIG. 1, an end user 102 interacts with a data processing arrangement such as a mobile communications device 104. The mobile communications device 104 is coupled to a network 105. A second user 106 also interacts with a second communications device 108 that is coupled to the network 105.

In accordance with the desires of the users 102, 106, the mobile communications devices 104, 108 are configured to receive various information feeds 110 and 112, respectively. For purposes of illustration, the information feeds 110, 112 will be described in the context of network-coupled communications devices, although it will be appreciated that the information feeds may be utilized in any type or manner of data communications framework (e.g., direct coupled devices). The information feeds 110, 112 include at least sequence of incoming data that may be grouped by one or more parameters. The parameters may include a source Uniform Resource Locator (URL) of the feed source, a descriptor of the feed, etc. The information feeds 110, 112 may conform to various formats such as RSS and Atom, or be based on proprietary protocols and formats. Generally, the feeds 110, 112 may be capable of automatic and/or manual updates to present a current representation of data accessible by the feed.

The information feeds 110, 112 may contain data that is complete in itself, or the feeds 110, 112 may contain metadata (e.g., titles, summaries) that describes a source of information and provide a reference (e.g., a URL) to the a more detailed information source. In the latter case, the users 102, 106, may need to initiate some action, such as activating a component in a Graphical User Interface (GUI), to access the more detailed information source.

The information feeds 110, 112 are generally implemented as a collection of data that is pushed to the mobile devices 104, 108. The information feeds 110, 112 may originate from any data source of the environment 100, including servers and peers of the communication device. It will be appreciated that the information feeds 110, 112 may also be two-way communications channels, such that the users 102, 106 may also send data out via the feeds 110, 112. The outgoing data may be directed towards a server or peers as appropriate.

It will be appreciated that the mobile devices 104, 108 may be able to access information feeds 110, 112 by means known in the art. Feeds may be accessed, for example, by typing a URL that references a feed into a feed reader application. For example, an RSS feed can be subscribed to by accessing the URL of an extensible Markup Language (XML) file that describes data available via the feed.

However, for some devices, and particularly for mobile devices, it is inconvenient to type in URLs. Even cutting and pasting text can be difficult, and the display of a mobile device may not be suitable for showing a long URL. Therefore, the mobile devices 104, 108 are capable of passing a token 113 between the devices to share information about the information feeds 110, 112 accessible by the devices 104, 108. The token 113 may be any discrete or continuous collection of data usable to share data related to the information feeds 110, 112. The token 113 may be a data stream, binary file, text file, data stream, etc. In one example, the token 113 is formatted as an Outline Processor Markup Language (OPML) document. An OPML document is prepared in an XML-based format that allows exchange of outline-structured information between applications that may run on different operating systems and environments.

Typically, the token 113 allows a first user 102 to share data selected from an information feed 110 accessible by the first user's device 104. The first user 102 sends the token 113 to the device 108 of a second user 106. The second user 106 can then easily accept, store, review, and utilize all or part of the data referenced in the token 113. The token 113 can be used by the second user 106 to automatically configure his or her own information feeds 112 based on data contained in the token 113.

The exchange of information feed tokens 113 provides many advantages for mobile device users. The tokens 113 allow users to easily share information feed data with other users. The devices 104, 108 can be arranged so that the users can send and receive information feed references without ever having to deal with a URL. The information feeds themselves provide selected information in a reduced format that is particularly suited for use on mobile devices. Therefore the exchange of feed data using tokens 113 allows users to conveniently communicate feeds to other users, and allow the recipients of the tokens 113 to easily incorporate the feeds into their devices.

The information feed tokens 113 may be communicated between target devices in any number of known manners. These manners include via a landline network(s) 114, which may include a Global Area Network (GAN) such as the Internet, one or more Wide Area Networks (WAN), Local Area Networks (LAN), and the like. Any computing device 115 or other electronic device that supports network data exchanges may participate in information feed exchanges according to the present invention. Such devices 115 include servers 116, desktop computers 118 or workstations, laptop or other portable computers 120, or any other similar computing device capable of communicating via the network 114, as represented by generic device 122.

The information feed tokens 113 may be also communicated via one or more wireless networks 124, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device 125 can participate in using information feeds 110, 112, such as laptop or other portable computers 126, mobile phones 128 and other mobile communicators, Personal Digital Assistants (PDA) 130, or any other similar computing device capable of communicating via the wireless network 124, as represented by generic device 132.

Devices 133 using short-range wireless technologies 134, such as Bluetooth, Wireless Local Area Network (WLAN), infrared (IR), etc, may also participate in information feed exchanges according to the present invention. The information feed tokens 113 can also be distributed using direct-wired or wireless connections, such as depicted by connection path 136 between computer 118 and generic wired device 122. The present invention is applicable regardless of the manner in which data is provided or distributed between the target devices.

Figure 2:
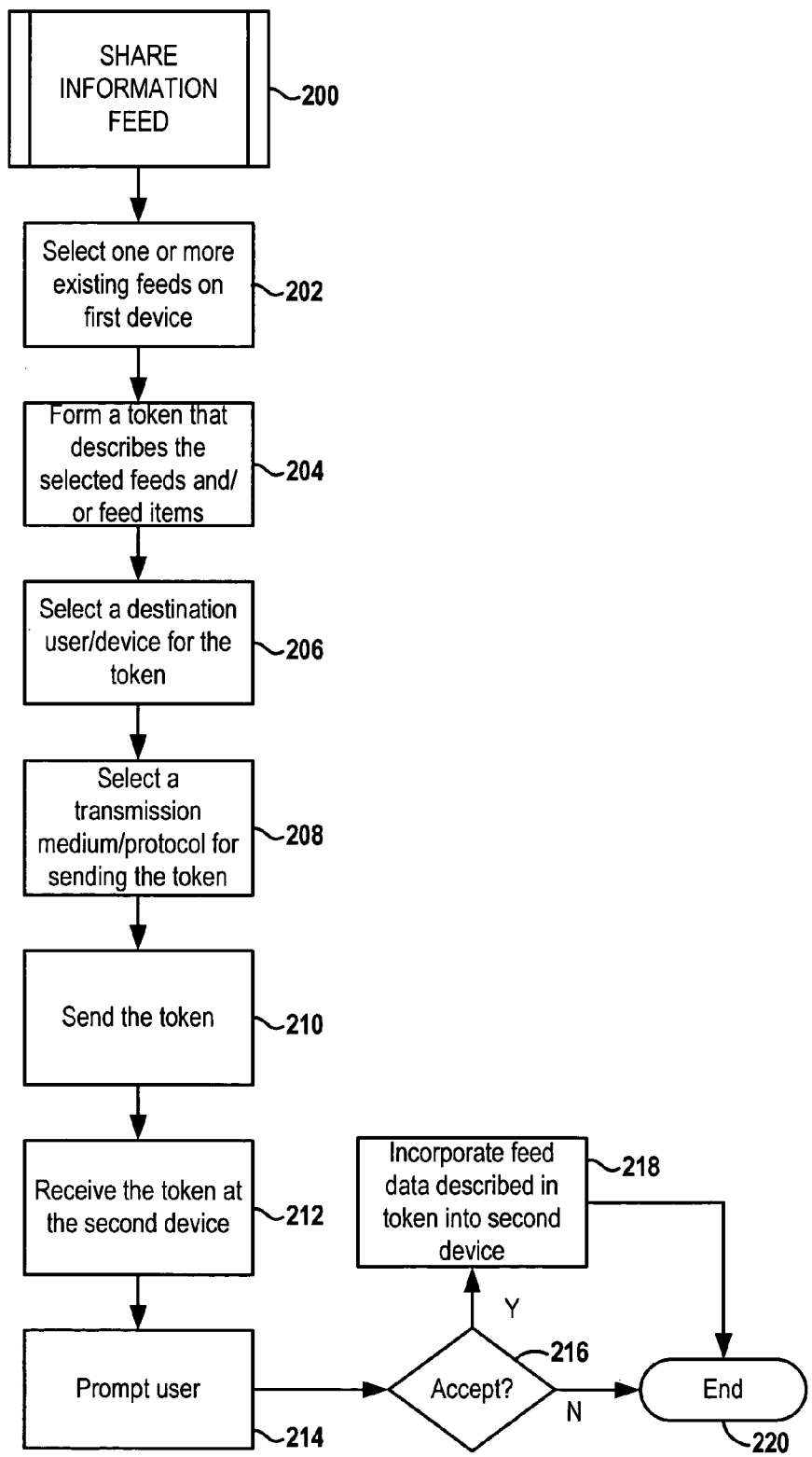
FIG. 2 illustrates a procedure for sharing information feed data according to embodiments of the present invention.

An example procedure 200 for sharing information feeds according to embodiments of the present invention is shown in FIG. 2. Typically, a user of a first device has a collection of information feeds already stored on the device. The user may have acquired the feeds using methods known in the art, including typing in a URL, Web searches, selection of a hyperlink on a Web page, etc. The user wishes to send a data pertaining to one or more feeds on the first device. The user can select (202) these feeds, which are used to form (204) a token that describes the selected feeds. The token may be formed by including references (URLs) of all the selected feeds, and/or the token may include data items contained in the selected feeds. Generally, the user may use a different context/menu when sending a reference to a feed and sending particular data within a feed. Even when the user only selects a single data item (e.g., story or summary) to send, the token may be formed (204) to include a reference to the feed so that the recipient can subscribe to the feed based only on the single data item if that user so chooses.

The user will then select (206) a destination for the token. The destination may any combination of a particular user identifier (e.g., username) or a particular device identifier (e.g., hostname or IP address). The user will also select (208) a protocol and or medium for transmission of the token. The transmission mediums may include wired or wireless network interfaces, wired or wireless direct connection interfaces, or any other data transfer medium (e.g., flash memory). The protocols may include any combination of Simple Mail Transfer Protocol (SMTP), Short Message Service (SMS), peer-to-peer protocols (e.g., Gnutella), Bluetooth, Session Initiation Protocol (SIP), HyperText Transfer Protocol (HTTP), and any other data transfer protocol known in the art. Typically, the user will select (208) a stack of protocols that use a well-known identifier. For example, if the user selects to send the token by e-mail, this may include using SMTP over a Transmission Control Protocol/Internet Protocol (TCP/IP) connection. In other cases (e.g., using a wireless device), the email may be delivered using one or more protocols included in the Wireless Application Protocol (WAP) specification to communicate with an SMTP server. In other arrangements, the first device may be configured to send the token using a default connection method, so that the user is not required to select (208) a protocol or medium.

After the information feeds and protocols have been selected, the first device will send (210) the token to a second device. The procedure may also be used to send (210) the token to multiple devices, such as by the use of email groups or SMS text messaging groups. The second device will receive (212) the token, after which the user of the second device may be prompted to determine (216) whether to accept the token. If the token is declined, the procedure can end (220). If the token is accepted, then the second device will incorporate (218) the data contained in the token.

Figure 3:
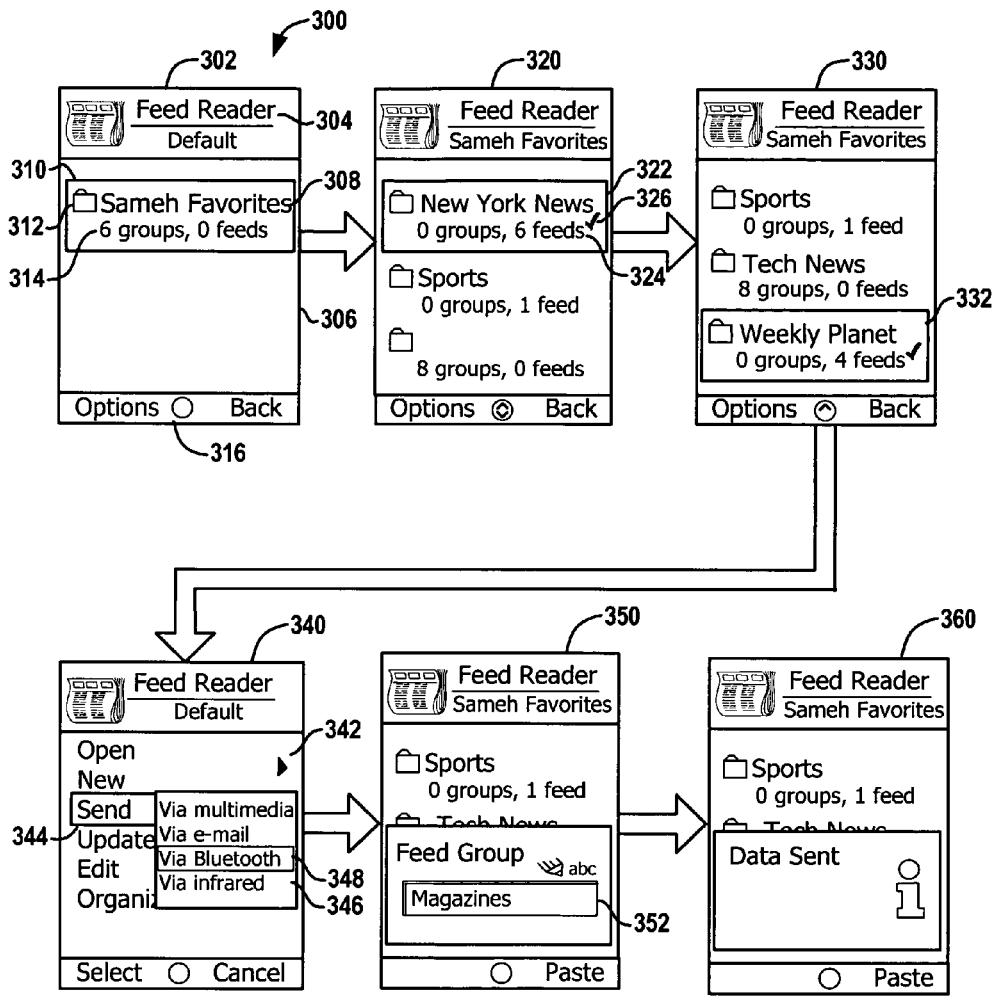
FIG. 3 includes a sequence of Graphical User Interface (GUI) panels that illustrate selecting and sending information feed data according to embodiments of the present invention.

A more detailed example of sharing information feed data according to embodiments of the present invention is shown in FIG. 3. FIG. 3 includes a sequence of panels that represent actions performed on a GUI 300 of a mobile device. In this example, the user of the device wishes to share a set of information feed with a second user. It will be appreciated that FIG. 3 and related figures illustrate only one possible implementation of the information feed sharing functions according to embodiments of the present invention. Other user interface elements and procedures may be equally effective in providing feed sharing. For example, simple command line functions and/or keystroke inputs may be used to achieve similar results in a feed reader.

In the first panel 302 of FIG. 3, a title bar 304 indicates that the device is currently running a feed reader application in the foreground. A lower portion 306 of the GUI 300 displays a list of available feeds and/or groups of feeds. In this case, there is a single group 308 available. The group 308 is currently selected as indicated by a rectangle 310. A folder icon 312 is used to indicate that group 308 is a collection. The listing 314 below the group's title also shows that group 308 is a collection, in this case a collection of six other groups.

The user may choose to enter, or "dive down," into the group 308 by use of a menu 316 or other GUI control. A partial listing of the contents of group 308 is shown in panel 320. A group 322 labeled "New York News" is shown highlighted. The listing 324 indicates that the "New York News" group 322 contains six news feeds and no groups. Generally, the groups illustrated in the GUI 300 may contain any combination of feeds and other groups.

The GUI 300 generally provides a mechanism (e.g., menu options) that allows the user to select one or more groups and feeds. As illustrated in panel 320, the "New York News" group 322 is selected as indicated by the checkmark 326. The user may select groups for many different purposes. In this example, the user has selected the "New York News" group 322 in order to share the feeds within that group with another user. The user has also selected the "Weekly Planet" group 332 as indicated in panel 330. Although this example shows feed groups 322, 332 being selected for sharing, it will be appreciated that individual feeds within groups may also be selected using a similar mechanism.

After the user has finished selecting groups and/or feeds, the GUI 300 provides a way to send these feeds. This is illustrated in panel 340, where a menu 342 provides an option 344 to send the selected groups and/or feeds. In this example, the send option 344 has a submenu 346 for various communications options. The illustrated submenu 346 includes options for sending the feed data via multimedia (e.g., SIP), e-mail, Bluetooth, and infrared. It will be appreciated that many other options may be include for sharing the feed data, including SMS, instant messaging, peer-to-peer networking, Web services (e.g., HTTP POST, SOAP), remote procedure calls, direct wired transfer, networked files protocols, etc. As indicated by the rectangle 348, the user in this example will share the selected feeds using Bluetooth.

Panel 350 indicates that the user can attach a descriptive label 352 to the groups that are to be communicated. The descriptive label 352 may be a title, or may include more text (e.g., a paragraph) explaining the purpose of the feed information being shared. After the user has applied the label 352, the data is sent, as indicated in panel 360. The data may be sent to a selected user, or to a default user for a particular communications medium. An example of sending to a selected user is where the data is shared via e-mail or SMS, and the user is selected via an email address or phone number, respectively. An example of a default user is where there are existing peer-to-peer links set up between devices using technologies such as Bluetooth, zeroconf, Gnutella, or other peer-to-peer networking technologies. In this case, the data may be published for anyone to receive, or may be sent by default over a particular existing link of the peer-to-peer network.

Figure 4:
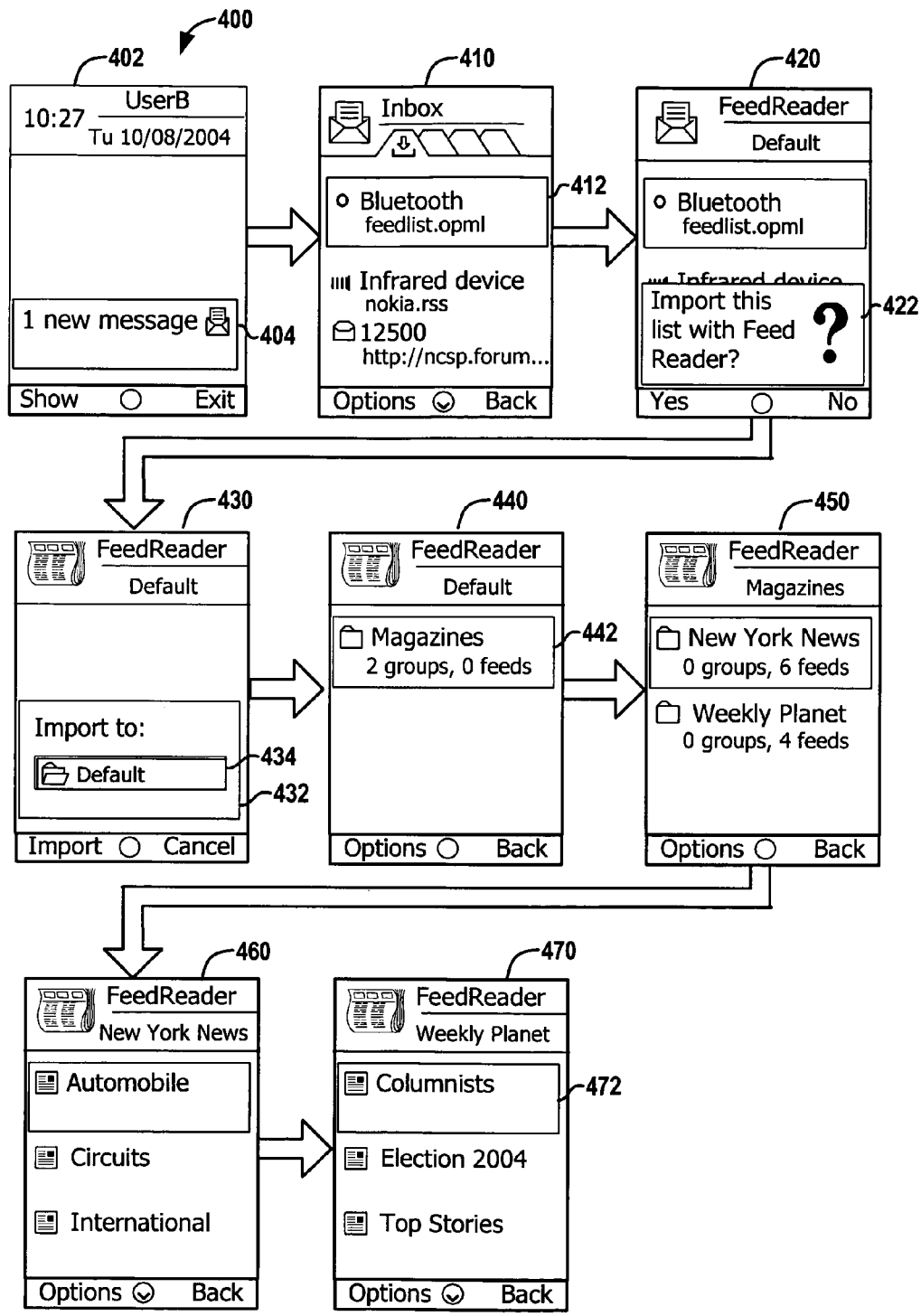
FIG. 4 includes a sequence of GUI panels that illustrate receiving and viewing information feed data according to embodiments of the present invention.

The feed data selected as in FIG. 3 is sent to a receiving device in the form of a file, token, or other data entity. In reference now to FIG. 4, a GUI 400 of a receiving device is used to illustrate an example sequence of events that may occur when receiving feed data according to embodiments of the present invention. In the first panel 402, the recipient is given notice 404 of an incoming message. The recipient navigates to an Inbox as shown in panel 410. The Inbox is typically a general-purpose location for accessing all types of incoming data. The Inbox shows an incoming message 412 received from a Bluetooth connection. The received data 412 in this example is formatted as an OPML file. The user may already know that OPML files may be used to import feeds, or this fact may be communicated to the user by such mechanisms as help screens, metadata associated with the message (e.g., sender's comments), an icon attached to the message, etc. The system may also have a pre-registered action associated with this file type so that the user can import the feed data by opening the file. The user may also open the file by using any other mechanisms conforming to the usage of the GUI 400 and underlying computer software environment.

After opening the message 412, the user may see a prompt 422 as shown in panel 420 to verify that the data should be imported. Assuming that the user accepts the prompt 422, the user may be presented with a dialog 432 as shown in panel 430. The dialog 432 allows the user to place the received list data in a data storage location accessible by the feed reader. In the illustrated dialog 432, the user can select from a list 434 of existing locations in which to place the imported data. The user may also be able to create a new storage location by typing or some other mechanism provided in the GUI 400. After importing the data, the information feeds are accessible to the user via the feed reader as shown in panel 440. Note that the name of the imported feed group, "Magazines," is the same name given by the sender in panel 350 of FIG. 3. The user may then navigate through the feeds in the manner provided by the feed reader, and indicated in panels 450, 460, and 470. Panels 460 and 470 show the feeds available within the "New York News" and "Weekly Planet" groups, respectively. In these views 460, 470, the user may select a feed, such as the Columnists 472, and view individual data items currently in the feed 472.

Devices according to the embodiments of the present invention may share information feeds at any level of granularity desired. This means that the users may share collections of feeds, individual feeds, and individual data items within the feeds. The granularity may also be extended to allow limited content sharing, rich content sharing, single source sharing, organized multiple source sharing, etc. Rich content sharing is a particularly useful feature provided by feed readers.

Generally, the present invention allows users to send, receive, and utilize the feed data using only a minimal amount of user intervention. By providing sharing features in a feed reader and similar programs, new behaviors and activities can grow around the feed reader. For example, users may create information feeds with popular jokes and share it between mobile phones.

Figure 5:
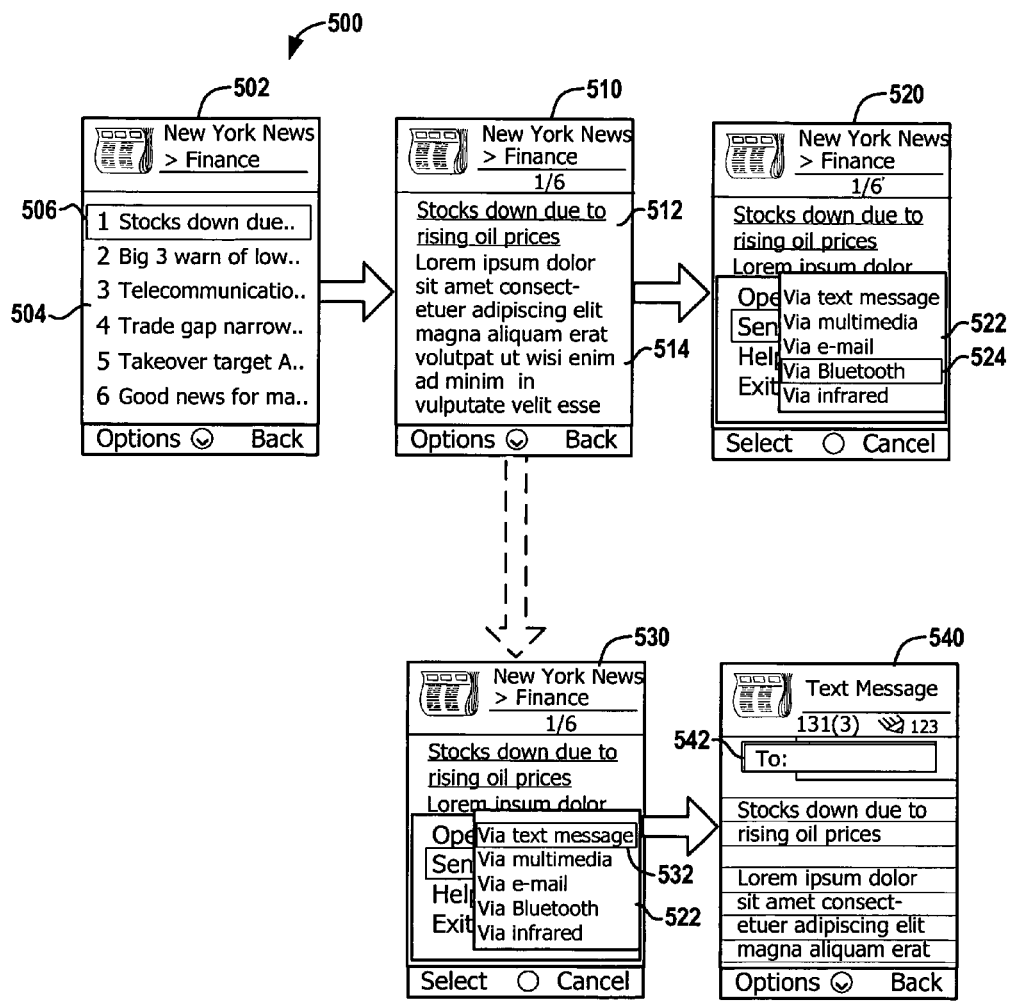
FIG. 5 includes a sequence of GUI panels that illustrate selecting and sending information feed items according to embodiments of the present invention.
Figure 6:
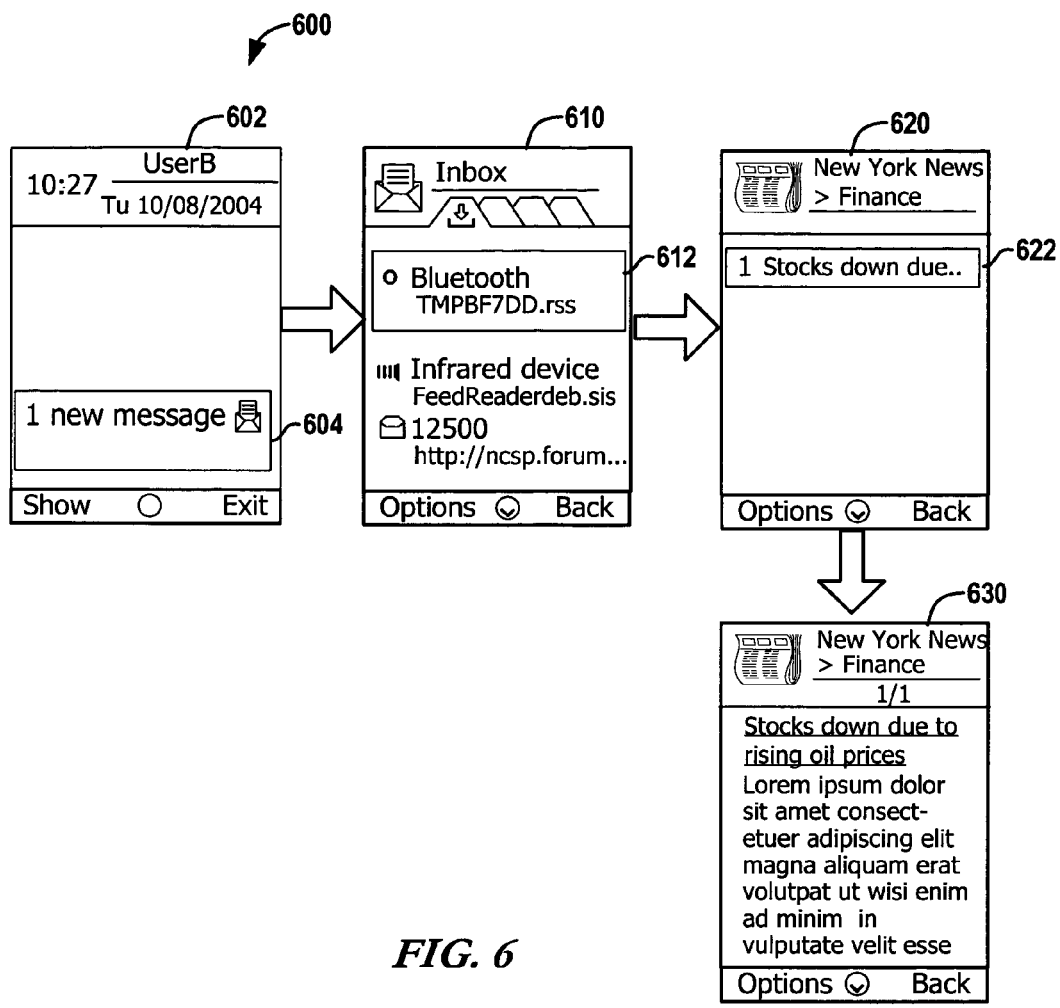
FIG. 6 includes a sequence of GUI panels that illustrate receiving and viewing information feed items according to embodiments of the present invention.

An example of sharing individual feed items according to embodiments of the present invention is shown in FIGS. 5 and 6. In FIG. 5, a GUI 500 shows various details of a feed reader similar to those shown in FIGS. 3 and 4. The first panel 502 includes a list 504 of feed items available for viewing. The first feed item 506 is currently selected in the panel 502.

The user may view the selected feed item 506 in the GUI to see the contents of the item 506. The contents of the selected item 506 are shown in panel 510. This item contains a title portion 512 that was used (in an abbreviated form) to identify the item 506 in panel 502. A body portion 514 provides the details of the story. The title 512 and/or body 514 portions may include other elements besides text, such as graphics and hyperlinks.

The user may wish to share an individual feed item such as shown in panel 510. The data shared may include any combination of the text in the feed item (e.g., title 512 and body 514), objects embedded in the feed item (e.g., hyperlinks, graphics) and a reference to the feed from where the article originated. One example of sending the feed item is shown in panel 520. The user brings up a menu 522 and selects a Bluetooth option 524. An alternate selection is shown in panel 530, where the user has selected a text message option 532. In this latter example, the message may be formatted as plain text as shown in panel 540. The user will enter the number of the text message recipient in the text entry box 542.

The recipient may receive the feed item as shown in the GUI 600 of FIG. 6. In panel 602, the user receives an incoming message notification 604. The user maneuvers to the Inbox as shown in panel 610, where an incoming RSS file is shown highlighted with a box 612. The user can open this file, and the feed reader will then display the data item 622 as shown in panel 620. The user can read the data item as shown in panel 630.

Figure 7:
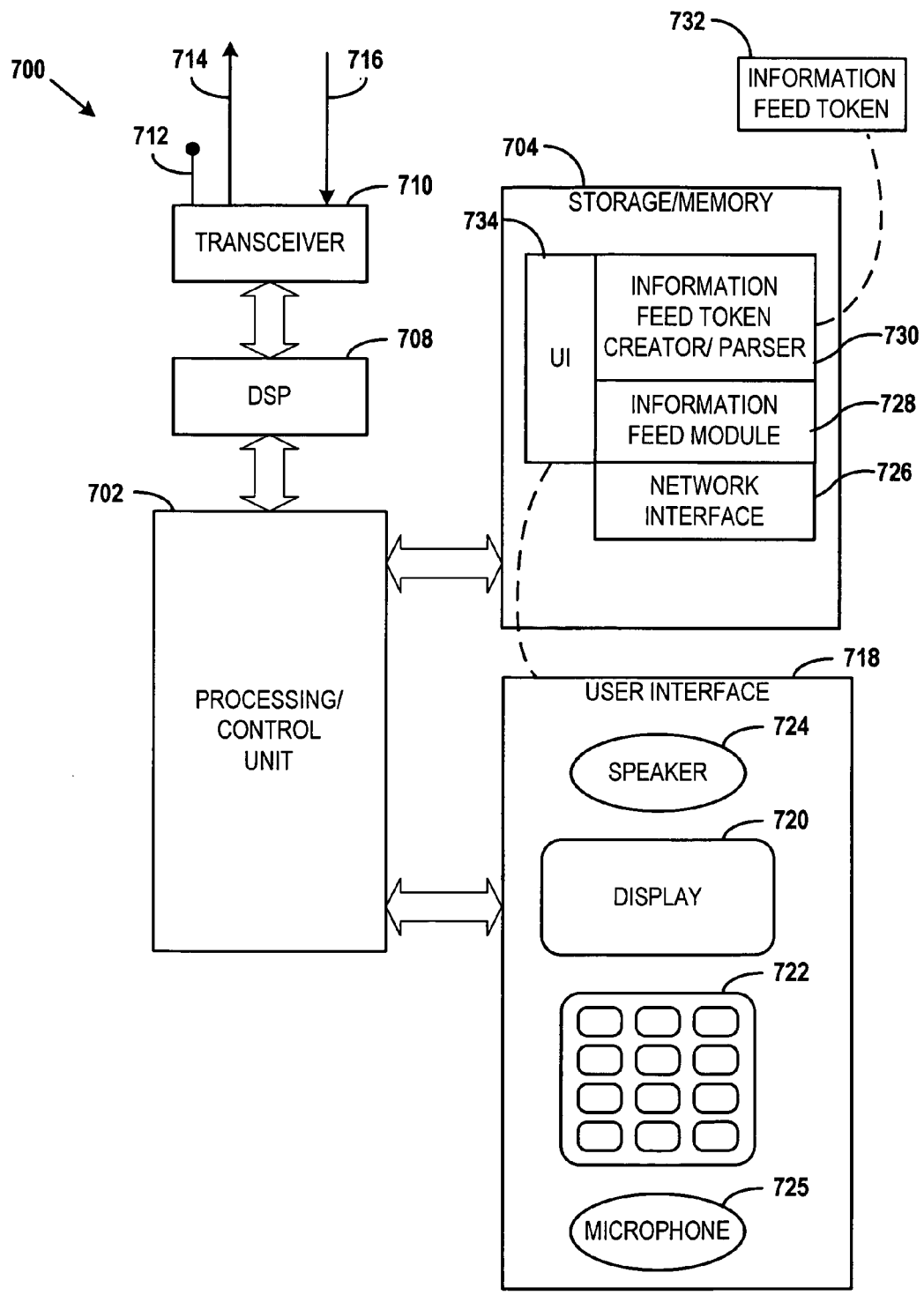
FIG. 7 illustrates an example data processing arrangement for sharing feed data according to embodiments of the present invention.

An example of a target device that utilizes information feeds according to embodiments of the present invention is illustrated in FIG. 7 as the mobile computing arrangement 700. Those skilled in the art will appreciate that the exemplary mobile computing arrangement 700 is merely representative of general functions that may be associated with such mobile devices, and also that landline computing systems similarly include computing circuitry to perform such operations.

The mobile computing arrangement 700 is suitable for processing one or more information feeds in accordance with embodiments of the present invention. The representative mobile computing arrangement 700 includes a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor.

The processing unit 702 controls the basic functions of the mobile computing arrangement 700. Those functions associated may be included as instructions stored in a program storage/memory 704. The program storage 704 may include one or more of read-only memory (ROM), flash ROM, programmable and/or erasable ROM, random access memory (RAM), subscriber interface module (SIM), wireless interface module (WIM), smart card, or other removable memory device.

In one embodiment of the invention, the program modules associated with the storage/memory 704 are stored in non-volatile electrically-erasable, programmable ROM (EEPROM), flash ROM, etc. so that the information is not lost upon power down of the mobile computing arrangement 700. The relevant software for carrying out conventional mobile terminal operations and operations in accordance with the present invention may also be transmitted to the mobile computing arrangement 700 via data signals, such as being downloaded electronically via one or more networks, such as the Internet and an intermediate wireless network(s).

The processing/control unit 702 includes circuitry for performing wireless data transmissions. This circuitry may include a digital signal processor (DSP) 708 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 710, generally coupled to an antenna 712, transmits the outgoing radio signals 714 and receives the incoming radio signals 716 associated with the wireless device 700.

The processor 702 is also coupled to user-interface 718 elements associated with the mobile terminal. The user-interface 718 of the mobile terminal may include, for example, a display 720 such as a liquid crystal display, a keypad 722, speaker 724, and microphone 725. These and other user-interface components are coupled to the processor 702 as is known in the art. Other user-interface mechanisms may be employed, such as voice commands, switches, touch pad/screen, graphical user interface using a pointing device, trackball, joystick, or any other user interface mechanism.

In one arrangement, the program storage/memory 704 includes software modules such as a network interface module 726 and an information feed processing module 728. The network interface 726 may include drivers and other software components for communicating with circuitry coupled to the processing/control unit 702 for performing wireless data transmissions. The information feed processing module 728 allows configuration and management of information feeds via the network interface 726. The network interface 726 may include software components (e.g., drivers, protocol stacks) that allow data transfers over wired or wireless network devices of the mobile computing arrangement 700.

The program/storage memory 704 may also include a creator/parser module 730 for creating and parsing information feed tokens 732. The creator/parser module 730 may communicate with the information feed module 728 and the network interface 726 for handling the various transactions associated with sharing information feed data. The creator/parser module 730 may communicate with a user interface (UI) module 734 that handles communications with the hardware user interface 718.

The creator/parser module 730 can be utilized to easily implement sharing of information feed data. For example, the creator parser module 730 may receive a token 732 either directly or indirectly via the network interface 726. The contents of the token 732 may be analyzed by the creator/parser module 730 to determine authenticity, correct format, correct destination, etc. The receipt of the token 732 may be communicated to the user by the creator/parser module 730 via the UI module 734. If the user accepts the token 732, the creator/parser module 730 may automatically configure the information feed module 728 to access and/or display data associated with the appropriate information feeds.

In another example, the creator/parser 730 may receive, via the UI module 734, a request to share information feed data. The data that describes the shared feeds (e.g., XML formatted data, URL of feed source, etc.) may be provided via the UI 734 and/or the information feed module 728. The data will be used to form an outgoing token 732 targeted for another network device. The creator parser 730 may interact with the network interface 726 for choosing a medium and protocol for sending the token 732. The creator parser 730 may also interact with other system components, such as an address book application (not shown) for choosing a destination user/device.

The mobile computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Hardware, firmware, software or a combination thereof may be used to perform the various functions and operations described herein of a distributed-computation program. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a distributed-computation system, apparatus, and method in accordance with the present invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method comprising facilitating a processing of and/or processing (1) data and/or (2) information and/or (3) at least one signal, the (1) data and/or (2) information and/or (3) at least one signal based, at least in part, on the following:
  a receipt, at a data processing arrangement, of a token independently of an information feed, the token describing the information feed and being formed based on a user-defined collection of information feed data at a sending node, wherein the information feed pushes updated syndicated content to one or more subscribers via an information provider independently from the sending node;
  a processing of the token to store information associated with the token to facilitate accessing the information feed; and
  a subscription to the information feed at the data processing arrangement based on the processing of the token.

2. The method of claim 1, wherein the (1) data and/or (2) information and/or (3) at least one signal are further based, at least in part, on at least one determination to prompt a user of the data processing arrangement to confirm acceptance of the token before processing the token.

3. The method of claim 1, wherein the processing of the token comprises determining a reference to one or more information feeds from the token.

4. The method of claim 1, wherein the information feed automatically and continually periodically pushes updated syndicated content to the one or more subscribers via the information provider.

5. The method of claim 1, wherein the sending node is a peer of the data processing arrangement.

6. The method of claim 1, wherein the sending node and the data processing arrangement comprise mobile terminals.

7. The method of claim 1, wherein the information feed comprises an RSS feed.

8. The method of claim 1, wherein the token comprises an Outline Processor Markup Language (OPML) file.

9. The method of claim 1, wherein the token comprises a reference to one or more information feeds, and the reference to one or more information feeds is arranged as a hierarchical collection.

10. The method of claim 1, wherein the (1) data and/or (2) information and/or (3) at least one signal are further based, at least in part, on the following: the token using at least one of e-mail, Bluetooth, infrared, short message service (SMS) and multimedia sessions.

11. A non-transitory computer-readable medium carrying one or more sequences of one or more instructions which, when executed by one or more processors, cause an apparatus to at least process and/or facilitate a processing of at least one result of:
  a receipt, at the apparatus, of a token independently of an information feed, the token describing the information feed and being formed based on a user-defined collection of information feed data at a sending node, wherein the information feed pushes updated syndicated content to one or more subscribers via an information provider independently from the sending node;
  a processing of the token to store information associated with the token to facilitate accessing the information feed; and
  a subscription to the information feed at the apparatus based on the processing of the token.

12. The non-transitory computer readable medium of claim 11, wherein the at least one result is further based, at least in part, on at least one determination to prompt a user via a user interface (UI) of the apparatus to confirm acceptance of the token before processing the token.

13. The non-transitory computer readable medium of claim 11, wherein the token includes a reference to one or more information feeds.

14. The non-transitory computer readable medium of claim 11, wherein the token comprises a structured data file.

15. The non-transitory computer readable medium of claim 14, wherein the structured data file comprises an Outline Processor Markup Language (OPML) file.

16. An apparatus, comprising:
   at least one processor; and
   at least one memory including computer program code,
   the at least one memory and the computer program code configured to, with the at least one processor, cause the apparatus to at least process and/or facilitate a processing of at least one result of:
      a receipt, at the apparatus, of a token independently of an information feed, the token describing the information feed and being formed based on a user-defined collection of information feed data at a sending node, wherein the information feed pushes updated syndicated content to one or more subscribers via an information provider independently from the sending node;
      a processing of the token to store information associated with the token to facilitate accessing the information feed; and
      a subscription to the information feed at the apparatus based on the processing of the token.

17. The apparatus of claim 16, wherein the token comprises an Outline Processor Markup Language (OPML) file.

18. The apparatus of claim 16, wherein the token comprises a reference to one or more information feeds.

19. The apparatus of claim 16, wherein the token comprises a data item of an information feed.

20. The apparatus of claim 16, wherein the apparatus is configured as a mobile terminal.

21. A method comprising facilitating a processing of and/or processing (1) data and/or (2) information and/or (3) at least one signal, the (1) data and/or (2) information and/or (3) at least one signal based, at least in part, on the following:
   at least one selection of one or more information feeds from a user-defined collection of information feed data at a data processing arrangement, wherein the one or more information feeds push updated syndicated content to one or more subscribers via an information provider independently from the data processing arrangement;
   at least one formation of a token describing how to subscribe to the one or more information feeds; and
   at least one transmission of the token independently of the one or more information feeds to facilitate subscription to the one or more information feed by a target apparatus.

22. The method of claim 21, wherein the (1) data and/or (2) information and/or (3) at least one signal are further based, at least in part, on at least one determination to prompt a user to determine a data transfer mechanism used for transmission of the token.

23. The method of claim 21, wherein the token comprises a reference to the one or more information feeds.

24. The method of claim 21, wherein the token comprises an Outline Processor Markup Language (OPML) file.

25. The method of claim 21, wherein the data processing arrangement is configured as a mobile terminal.

26. A non-transitory computer-readable medium carrying one or more sequences of one or more instructions which, when executed by one or more processors, cause an apparatus to at least process and/or facilitate a processing of at least one result of:
   at least one selection of one or more information feeds from a user-defined collection of information feed data at the apparatus, wherein the one or more information feeds push updated syndicated content to one or more subscribers via an information provider independently from the apparatus;
   at least one formation of a token describing how to subscribe to the one or more information feeds; and
   at least one transmission of the token independently of the one or more information feeds to facilitate subscription to the one or more information feed by a target apparatus.

27. The non-transitory computer readable medium of claim 26, wherein the at least one result is further based, at least in part, on at least one determination to prompt a user to determine a data transfer mechanism used for transmission of the token.

28. The non-transitory computer readable medium of claim 27, wherein the data transfer mechanism utilizes at least one of e-mail, Bluetooth, infrared, short message service (SMS) and multimedia sessions.

29. The non-transitory computer readable medium of claim 26, wherein the token comprises an Outline Processor Markup Language (OPML) file.

30. The non-transitory computer readable medium of claim 26, wherein formation of the token comprises including a reference to the one or more information feeds in the token.

31. An apparatus, comprising:
   at least one processor; and
   at least one memory including computer program code for one or more programs, the at least one memory and the computer program code configured to, with the at least one processor, cause the apparatus to at least process and/or facilitate a processing of at least one result of:
      at least one selection of one or more information feeds from a user-defined collection of information feed data at the apparatus, wherein the one or more information feeds push updated syndicated content to one or more subscribers via an information provider independently from the apparatus;
      at least one formation of a token describing how to subscribe to the one or more information feeds; and
      at least one transmission of the token independently of the one or more information feeds to facilitate subscription to the one or more information feed by a target apparatus.

32. The apparatus of claim 31, wherein the at least one result is further based, at least in part, on at least one determination to prompt a user to determine a data transfer mechanism used for transmission of the token.

33. The apparatus of claim 31, wherein the token comprises a reference to the one or more information feeds.

34. The apparatus of claim 31, wherein the token comprises an Outline Processor Markup Language (OPML) file.

35. The apparatus of claim 31, wherein the apparatus is configured as a mobile terminal.

* * * * *